Patented Apr. 28, 1931

1,802,442

UNITED STATES PATENT OFFICE

AGNES MULVILLE, OF LOS ANGELES, CALIFORNIA, ASSIGNOR TO THOMAS H. HASKETT, OF LOS ANGELES, CALIFORNIA

COMPOSITION OF MATTER

No Drawing. Application filed April 12, 1929. Serial No. 354,702.

The present invention is a composition of matter for use in producing ornamental tile, such as tapestry tile, and which may also be used for preserving wood, and for other building purposes.

In the practice of the invention, I employ lardite, silica and china clay in the proportions of seventy-five pounds of lardite, fifteen pounds of silica, and ten pounds of china clay. The ingredients are mixed with Rommany oil, after being ground to a fine flour, and thoroughly agitated until the composition has the consistency of thick cream, one gallon of Alinco oil being added to every one hundred pounds of the mixture. The composition thus produced is pure white and dry earthen colors may be added at will to obtain any desired color effect. The ordinary dry earthen colors of commerce are employed, being dissolved in Rommany oil and added promiscuously to the composition.

The compound may then be poured into molds of any desired character and permitted to dry, the resulting product being a tapestry tile or block especially adapted for use in ornamental floors, fireplaces and other parts of buildings. If a high gloss finish is desired, the composition must be poured on glass. When it is poured on tin, wood or other molds, a dull finish is obtained. If applied to woodwork as a paste, it will, when dry, form an effective enamel-like protecting finish therefor and may also be used for producing scenic effects.

Tile produced from this composition requires no baking while it is practically fireproof and is as attractive and durable as marble for ornamental purposes. As the essential constituents of the material are inorganic substances, there is practically no disintegration or crumbling even with age, the chemical reaction which occurs in the mixing converting the component parts into permanent stone.

The mixture, requiring no heating or baking, hardens in twelve hours into the finished article. A monolithic bathroom floor of average size may be poured in twenty minutes.

Lardite is a mineral found in China and Switzerland and possesses high preservative qualities. It is ground until it will pass a 200 mesh screen, being used as a fine flour.

Silica is a mineral found nearly everywhere. It is passed through a 200 mesh screen to attain the desired fineness and produces a glaze in the finished article.

China clay is a clay of the same grade which is used by makers of pottery, china ware, etc., and usually has to be baked, but in the practice of my invention no baking is required although the same results are obtained, to wit: durability, high polish and strength. The clay also prevents expansion and contraction.

Rommany oil is a prepared compound consisting of four pounds of common dairy salt, two ounces of tartaric acid, and two ounces of sulphate of ammonia added to one gallon of water. The presence of this compound facilitates the drying of the mixture.

Alinco oil is linseed oil bleached until, in appearance, it is like water. This oil prevents the composition from settling and drying too quickly in high temperatures.

Having thus described the invention, I claim:

1. A composition of matter containing lardite, silica, and china clay and a compound of salt, tartaric acid, sulphate of ammonia and water.

2. A composition of matter containing lardite, silica, and china clay ground to a fine flour, a compound of salt tartaric acid, sulphate of ammonia and water, and linseed oil, the whole being commingled by agitation.

In testimony whereof I affix my signature.

AGNES MULVILLE. [L. S.]